United States Patent
Theobold et al.

(10) Patent No.: US 7,315,533 B2
(45) Date of Patent: Jan. 1, 2008

(54) RADIO PLAN GENERATOR

(75) Inventors: David M. Theobold, Akron, OH (US); Lu Qian, Solon, OH (US); Bretton Lee Douglas, San Jose, CA (US); Brian Hart, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 260 days.

(21) Appl. No.: 11/102,509

(22) Filed: Apr. 8, 2005

(65) Prior Publication Data

US 2006/0227751 A1      Oct. 12, 2006

(51) Int. Cl.
*H04Q 7/24*      (2006.01)

(52) U.S. Cl. .................. 370/338; 370/329; 370/254

(58) Field of Classification Search ................ 370/254, 370/255, 329, 330, 338
See application file for complete search history.

(56) References Cited

U.S. PATENT DOCUMENTS

| | | | | |
|---|---|---|---|---|
| 6,023,459 | A | 2/2000 | Clark et al. | 370/329 |
| 6,178,328 | B1 | 1/2001 | Tang et al. | 455/447 |
| 6,317,599 | B1 | 11/2001 | Rappaport et al. | 455/446 |
| 6,499,006 | B1 | 12/2002 | Rappaport et al. | 703/20 |
| 6,625,454 | B1 | 9/2003 | Rappaport et al. | 455/446 |
| 2005/0094585 | A1* | 5/2005 | Golden et al. | 370/310 |
| 2005/0190732 | A1 | 9/2005 | Douglas et al. | 370/338 |
| 2006/0171346 | A1* | 8/2006 | Kolavennu et al. | 370/328 |

OTHER PUBLICATIONS

S. Zhou, M. Zhao, X. Xu, J. Wang and Y. Yao. "Distributed Wireless Communication System: A New Architecture for Future Public Wireless Access." *IEEE Communications Magazine*, vol. 41, Issue 3, Mar. 2003, pp. 108-113.

A. Doufexi, E. Tameh, A. Nix and S. Armour. "Hotspot Wireless LANs to Enhance the Performance of 3G and Beyond Cellular Networks." *IEEE Communications Magazine*, vol. 41, Issue 7, Jul. 2003, pp. 58-65.

I. Katzela and M. Naghshineh. "Channel Assignment Schemes for Cellular Mobile Telecommunication Systems: A Comprehensive Survey." *IEEE Personal Communications*, Jun. 1996, pp. 10-31.

G. Hampel, D. Abush-Magder, A. Diaz, L. Drabeck, M. Flanagan, J. Graybeal, J. Hobby, M. MacDonald, P. Polakos, J. Srinivasan, H. Trickey, L. Zhang, and G. Rittenhouse. "The New Paradigm for Wireless Network Optimization: A Synergy of Automated Processes and Human Intervention." *IEEE Communications Magazine*, vol. 43, Issue 3, Mar. 2005, pp. S14-S21.

(Continued)

*Primary Examiner*—Edward F. Urban
*Assistant Examiner*—Christian A. Hannon
(74) *Attorney, Agent, or Firm*—Dov Rosenfeld; Inventek

(57) ABSTRACT

A method, apparatus, and carrier medium carrying instructions to assign frequency channels and transmit powers for a plurality of access points of a wireless network. The method includes, until there are no more access points to which to assign a transmit power and frequency channel, selecting a next current access point, determining for a set of at least one transmit power for a set of at least one frequency channel a measure of the quality of the sub-network formed by the current access point and all already-assigned access points an evaluation metric indicative of the quality of the sub-network, and assigning to the current access point the transmit power and frequency channel that minimizes the measure of the quality of the sub-network.

26 Claims, 10 Drawing Sheets

OTHER PUBLICATIONS

A. Hills and B. Friday. "Radio Resource Management in Wireless LANs." *IEEE Communications Magazine*, vol. 42, Issue 12, Dec. 2004, pp. S9-S14.

A. Hills and J. Schlegel. "Rollabout: A Wireless Design Tool." *IEEE Communications Magazine*, vol. 42, Issue 2, Feb. 2004, pp. 132-138.

A. Hills. "Large-Scale Wireless LAN Design." *IEEE Communications Magazine*, vol. 39, Issue 11, Nov. 2001, pp. 98-104.

Scalable Networks Press Release, May 12, 2004, http://www.scalable-networks.com/new/press/pressreleases13.php.

Scalable Networks Product Description for Product announced on May 12, 2004 http://www.scalable-networks.com/products/qualnet_wifi.php.

U.S. Appl. No. 11/219,596, titled "Radio Planning for WLANS," filed Sep. 1, 2005 to inventors Hart et al. Not yet published.

U.S. Appl. No. 10/933,102, titled "Rapid Search for Optimal Wireless Network Configuration," filed Sep. 2, 2004 to inventors Douglas et al. Not yet published.

U.S. Appl. No. 10/183,704, titled "Method and System for Dynamically Assigning Channels Across Multiple Radios in a WLAN," filed Jun. 25, 2002 to inventors Friday et al. Not yet published.

U.S. Appl. No. 10/409,246, titled "Method and System for Dynamically Assigning Network Resources in a Wireless Network," filed Apr. 7, 2003 to inventors Friday et al. Not yet published.

U.S. Appl. No. 10/913,561, titled "Method and System for Dynamically Assigning Channels Across Multiple Radios in a Wireless LAN," filed Aug. 6, 2004 to inventors Friday et al. Not yet published.

* cited by examiner

| NL | 109 | 71 | 103 | 106 | 115 | 74 | 85 | 101 |
|---|---|---|---|---|---|---|---|---|
| 108 | NL | 92 | 91 | 95 | 81 | 104 | 103 | 87 |
| 73 | 91 | NL | 90 | 110 | 105 | 88 | 83 | 81 |
| 103 | 93 | 90 | NL | 101 | 85 | 96 | 76 | 87 |
| 106 | 94 | 111 | 104 | NL | 105 | 96 | 108 | 90 |
| 110 | 85 | 108 | 88 | 104 | NL | 110 | 94 | 90 |
| 78 | 108 | 89 | 99 | 98 | 112 | NL | 96 | 91 |
| 89 | 103 | 87 | 79 | 109 | 94 | 97 | NL | 92 |
| 101 | 87 | 85 | 88 | 92 | 89 | 90 | 91 | NL |

FIG. 4A

| 0 | 1 | 1 | 1 | 1 | 0 | 1 | 1 | 1 |
|---|---|---|---|---|---|---|---|---|
| 1 | 0 | 1 | 1 | 1 | 1 | 1 | 1 | 1 |
| 1 | 1 | 0 | 1 | 1 | 1 | 1 | 1 | 1 |
| 1 | 1 | 1 | 0 | 1 | 1 | 1 | 1 | 1 |
| 1 | 1 | 1 | 1 | 0 | 1 | 1 | 1 | 1 |
| 1 | 1 | 1 | 1 | 1 | 0 | 1 | 1 | 1 |
| 1 | 1 | 1 | 1 | 1 | 1 | 0 | 1 | 1 |
| 1 | 1 | 1 | 1 | 1 | 1 | 1 | 0 | 1 |
| 1 | 1 | 1 | 1 | 1 | 1 | 1 | 1 | 0 |

FIG. 4B

| 0 | 0 | 1 | 0 | 0 | 0 | 1 | 1 | 1 |
|---|---|---|---|---|---|---|---|---|
| 0 | 0 | 1 | 1 | 1 | 1 | 0 | 0 | 1 |
| 1 | 1 | 0 | 1 | 0 | 0 | 1 | 1 | 1 |
| 0 | 1 | 1 | 0 | 1 | 1 | 1 | 1 | 1 |
| 0 | 1 | 0 | 0 | 0 | 0 | 1 | 0 | 1 |
| 0 | 1 | 0 | 1 | 0 | 0 | 0 | 1 | 1 |
| 1 | 0 | 1 | 1 | 1 | 0 | 0 | 1 | 1 |
| 1 | 0 | 1 | 1 | 0 | 1 | 1 | 0 | 1 |
| 1 | 1 | 1 | 1 | 1 | 1 | 1 | 1 | 0 |

FIG. 4C

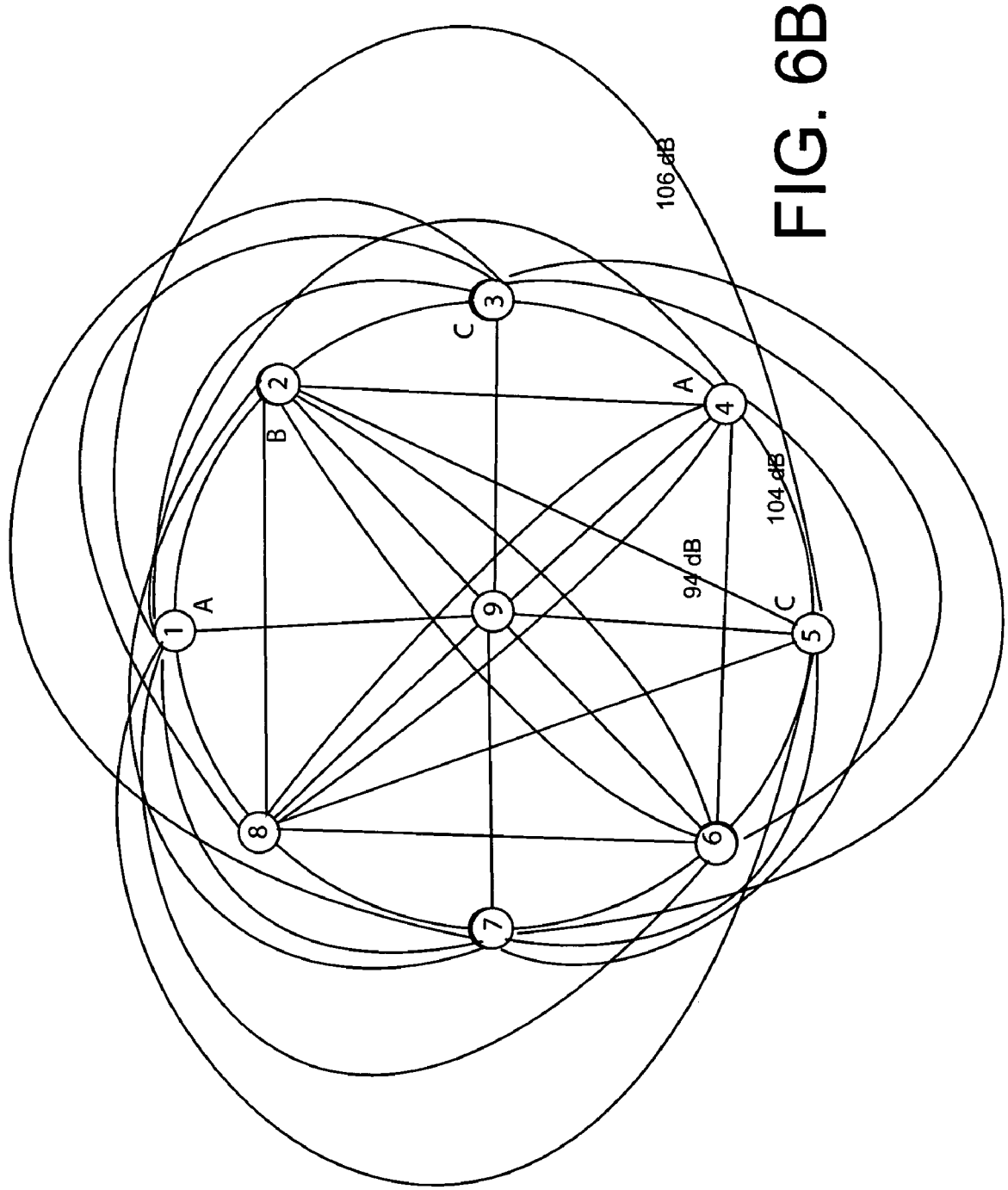

RADIO PLAN GENERATOR

RELATED PATENT APPLICATION

The present application is related to the subject matter of U.S. application Ser. No. 10/933,102 to inventors Douglas, et al., filed on Sep. 21, 2004, assigned to the assignee of the present invention, and titled "RAPID SEARCH FOR OPTIMAL NETWORK CONFIGURATION," the contents of which are herein incorporated by reference in their entirety for all purposes.

The present application is also related to the subject matter of U.S. application Ser. No. 10/791,466 to inventors Douglas, et al., filed on Mar. 1, 2004, assigned to the assignee of the present invention, and titled "QUALITY EVALUATION FOR WIRELESS COMMUNICATION NETWORKS," the contents of which are herein incorporated by reference in their entirety for all purposes.

BACKGROUND

The present invention is related to wireless networks, and in particular to radio plan generation to determine transmit frequencies and transmit powers in a wireless local area network (WLAN).

Radio plan generation for wireless local area networks, including the selection of a frequency channel, antenna configuration, and a transmit power level for each of a potentially large number of access points (APs), is an integral radio management function of a WLAN system. Current technology successfully manages in the order of 10's of APs, developing the radio plan in a timely fashion. Consider, for example, an IEEE 802.11b network that includes 10 typical access points. Each access point can be assigned to one of three possible channels and one of six possible power levels. Thus each access point has 18 possible configurations. This network would therefore have $18^{10}$ or approximately 3.6 trillion possible configurations. An exhaustive search of each possible configuration would take an extremely long time considering that some sort of quality metric must be evaluated for each considered configuration. Thus there is a need to develop a plan rapidly.

Furthermore, the number of APs to be managed is likely to grow significantly in the future, as could be the case in the deployment of a high-density enterprise system. It is desirable to have a technique that scales more directly to the number of APs.

Timeliness of frequency assignment is also a strong driver for implementation of dynamic frequency assignment standards, such as the IEEE 802.11 h standard, wherein mandated frequency changes can drive reassignment of large groups of APs. This must be done on the fly, with as little impact as possible on network throughput. Speed of reassignment becomes a key factor, especially when a large number of APs is involved.

Radio planning is known for cellular telephones, in particular, for so-called second generation (2G) cellular telephony. Many methods are known for frequency allocation for 2G cellular telephony. See for example, I. Katzela, N. Naghshineh; Channel assignment schemes for cellular mobile telecommunication systems: a comprehensive survey; IEEE Personal Communications (June '96).

See also, U.S. Pat. No. 6,023,459 to Clark et al., and U.S. Pat. No. 6,178,328 to Tang, et al. These methods assign frequency channel, but do not simultaneously assign transmit power.

In 2G cellular telephony, devices in each cell transmit without regard to who is transmitting in other cells. Communication is still reliable as long as the desired signal power is sufficiently far above the total interference power from all the other devices on the same channel. Therefore, in 2G systems, every effort is made to reduce the interference power. As a first step, channels are not reused until distant cells are available for such channels. This can be expressed as a graph coloring problem, where colors represent frequencies, and according to which physically adjacent (or more generally, nearly adjacent) regions have to be colored differently.

WLANs have much smaller cells than 2G systems, and hence achieve much higher per-user data rates. In exchange, WLANs cannot rely on regular cells, nor can the tricks of 2G engineers make up the difference. Walls, windows, doors, partitions, ceilings, and even filing cabinets can lead to anomalous propagation and non-uniform or overlapping cells.

For this and other reasons, WLANs re-define when devices are allowed to transmit. Instead of transmitting without regard to transmissions in other cells, 802.11 WLAN devices determine if the shared wireless medium is quiet and only transmit when this is so.

For example, for 2G systems, a frequency plan with adjacent co-channel APs is fatally poor. Handsets can transmit at the same time, and when they do, they create interference for one another so that the base-station cannot recover their data.

WLANs should ideally minimize the number of interfering devices, especially co-channel APs, that can detect each other, not the total interference power.

In summary, intuitive heuristics, developed from such fields as 2G cellular telephony, may be misleading when applied to WLANs. That is, the closest distance between two co-channel APs is less important than the total number of interfering APs.

Thus there is a need in the art for a method and system and software to derive a radio plan for a WLAN in a relatively straightforward and rapid fashion.

SUMMARY

Described herein are a method, an apparatus, and a carrier medium carrying instructions for a processing system to execute a method of assigning frequency channels and transmit powers for a plurality of access points of a wireless network. The method includes, until there are no more access points to which to assign a transmit power and frequency channel, selecting a next current access point, determining for a set of at least one transmit power for a set of at least one frequency channel a measure of the quality of the sub-network formed by the current access point and all already-assigned access point, the determined measure according to an evaluation metric indicative of the quality of the sub-network, and assigning to the current access point the transmit power and frequency channel that minimizes the measure of the quality of the sub-network.

In one embodiment, the method further includes accepting a measure of connectivity between the access points of the network as a set of pairwise path losses from each access point to a different access point of the network.

In one embodiment, the pairwise path losses are obtained by automatic measurements by the access points of the network. In another, the pairwise path losses are obtained by a path loss model, and in yet another, the pairwise path losses are obtained by measurements from a walk-through.

In one embodiment, the determining of the measure of quality and the assigning of the transmit power and frequency channel includes: starting with an initial transmit power for the current access point, determining the pairwise connectivity from the pairwise path loss using a path loss criterion based on the transmit power and a receiver sensitivity. The determining and assigning further includes ascertaining whether or not there is any frequency channel unused by any AP connected to the current AP, and if so, assigning to the current AP such an available frequency channel at the transmit power. If the ascertaining ascertains that no frequency channel is available, the determining and the assigning further includes repeating lowering the transmit power of the current access point to possibly cause one or more of the other access points to become disconnected to possibly free up a potential frequency channel until a frequency channel not used by any connected access point is available, or until no frequency channel is available even at the lowest possible transmit power. In the case a frequency channel frees as a result of the lowering of transmit power, the method assigns to the current access point the newly available frequency channel and the highest transmit power level at which the channel becomes available. In the case no frequency channel becomes available, the method includes assigning the initial transmit power to the current access point, considering groups of access points assigned each of the used frequency channels, and assigning the frequency channel of the group of access points already assigned with a frequency channel whose minimum path loss from the current access point is the highest.

Other aspects and features will become apparent from the description herein and the claims.

BRIEF DESCRIPTION OF THE DRAWINGS

FIG. 4A depicts a path loss matrix giving the path loss of each possible pairing among nine access points, each having a transmitter and a receiver, according to one aspect of the invention.

FIG. 4B shows the connectivity matrix for the path loss matrix of FIG. 4A with a transmit power of 20 dBm, and a receiver sensitivity of −92 dBm for all APs.

FIG. 4C shows the connectivity matrix for the path loss matrix of FIG. 4A with a transmit power of 10 dBm, and a receiver sensitivity of −92 dBm for all APs.

FIG. 5A shows the assigning of a color to the vertex 4 in a method embodiment of the invention

FIG. 6B shows the same graph corresponding to the path loss matrix of FIG. 4A, after the transmit power of AP 5 has been reduced to 15 dBm.

FIG. 8A shows the path loss matrix, together with the frequency channel and power assignments for APs 1 through 8, to use as an example for describing radio planning using a second quality metric, called the fast evaluation metric, according to another embodiment of the invention.

FIGS. 8B, 8C, and 8D show the path losses on channels A, B, and C, respectively, for five different transmit power assignments, and also show, as underlined, potential contentions. Such contentions are counted to evaluate the fast evaluation metric in one embodiment of the invention.

Other features and aspects will become apparent from the description herein.

DETAILED DESCRIPTION

Described herein are a method, a system, and a software program in a carrier medium to generate a radio plan for a wireless network such as a WLAN.

The present invention will be described with reference to a representative wireless network that substantially conforms to the IEEE 802.11 standard such as, e.g., 802.11a, 802.11b, 802.11g, or currently envisioned standards such as 802.11n. By substantially conforming we mean compatible with. The reader of this description is assumed to have access to the documents defining these standards, and all of the documents defining these standards are incorporated herein by reference in their entirety for all purposes. In the example discussed herein, a region to be covered by a wireless network is divided into cells with each cell having an access point (AP). Clients are associated with a particular access point and can communicate to and from the network via that access point.

Figure 1:
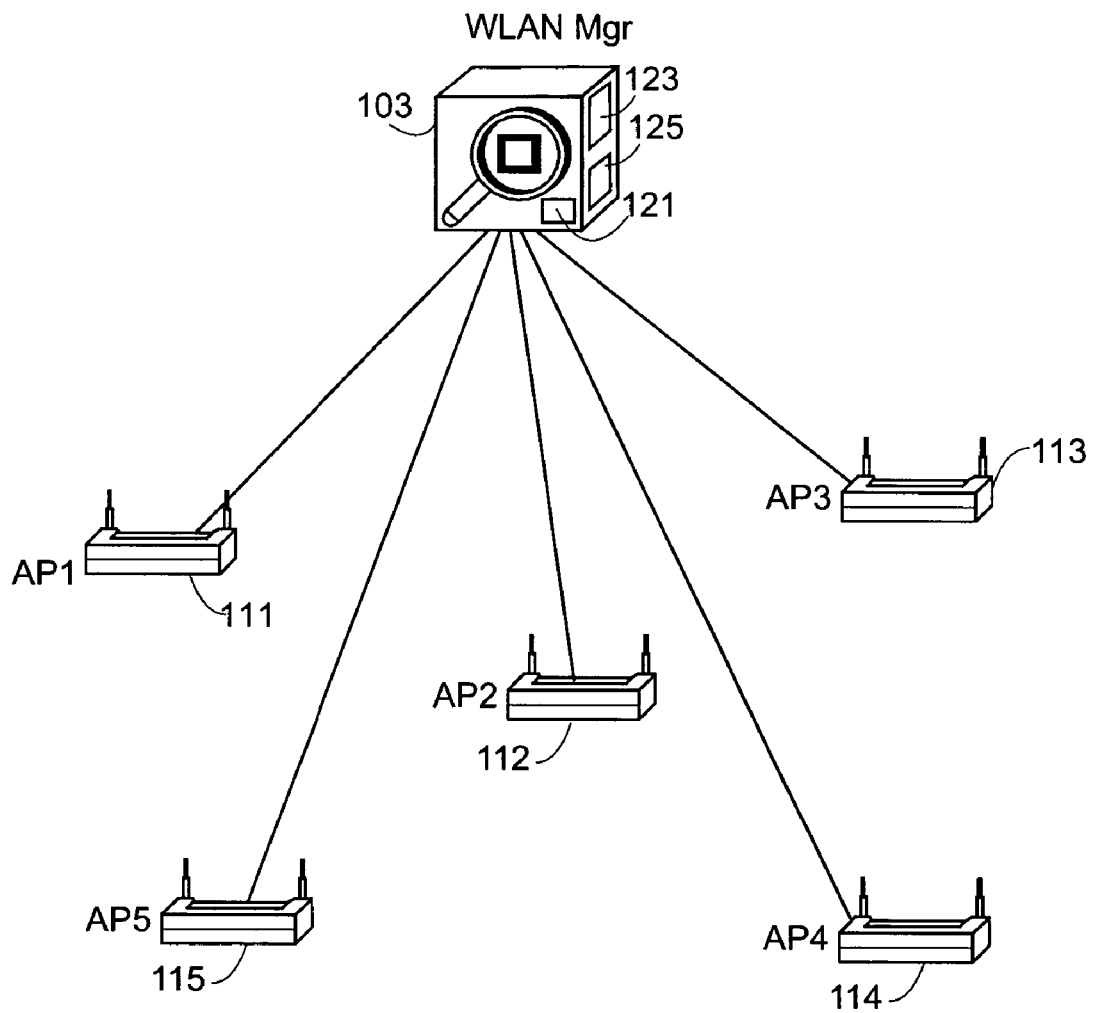
FIG. 1 shows one example of a network in which the present invention operates, including a management entity called the WLAN manager.

FIG. 1 depicts a representative wireless communications network 100 to which embodiments of the present invention may be applied. There are five access points: AP1 (111), AP2 (112), AP3 (113), AP4 (114) and AP5 (115). Each AP may have numerous associated clients (not shown). In one embodiment, each of the APs is part of a managed wireless network, and is a managed AP in the sense that each AP is in communication with a management entity of a managed wireless network.

Depending on the size and complexity, a managed network is either a set of APs with a central control entity, or a hierarchical structure with a set of hierarchical control domains that eventually are coupled to a set of APs. Each control domain is managed by a management entity we call a manager herein. The number of levels in the hierarchy depends on the complexity and/or size of the network, and thus not all managed networks have all levels of control. For example, a simple managed network may only have one level of control with a single management entity controlling all the APs. Factors that influence the selection of control domains include one or more of: the various types of IP subnet configurations; the radio proximity of the access points; the client station roaming patterns; the real time roaming requirements; and the physical constraints of the network (e.g. campus, building, and so forth.).

In one embodiment, a managed AP has several properties, including the ability to accurately measure its received power level, called the radio signal strength indication (RSSI) herein. A managed AP also has the ability to receive instructions from the WLAN manager to set its transmit power and the transmit frequency in the form of a channel number according to the received instruction.

Some aspects of the IEEE 802.11 standard are modified slightly to accommodate some management aspects of the managed APs. In one embodiment, managed stations of the network such as managed APs are able to measure the received signal strength (called received signal strength indication, or RSSI herein) relatively accurately. Managed access points furthermore transmit at known transmit powers.

For more information on radio management, see U.S. patent application Ser. No. 10/766,174 file Jan. 28, 2004 to inventors Olson, et al., titled A METHOD, APPARATUS, AND SOFTWARE PRODUCT FOR DETECTING ROGUE ACCESS POINTS IN A WIRELESS NETWORK, assigned to the assignee of the present invention, and incorporated herein by reference.

In this description, assume a single management entity called the WLAN Manager is assumed. The WLAN Manager manages several aspects of the wireless network, including, in one embodiment, generating the radio plan including assigning the transmit powers and the transmit channels for each of the APs.

In one embodiment, the WLAN manager authorizes the set of managed access points in the network, including maintaining a database called the Configuration Database that contains configuration parameters. The Configuration Database also includes an AP database that includes information on the managed APs, e.g., a list of the managed APs together with some data related to these APs, such as the location of the APs and the power the APs are able to transmit at. The WLAN Manager provides centralized control of various aspects of the radio environment within a given set of APs, including performing measurements to obtain path losses, and, according to an aspect of the invention, to determine the radio plan including network wide radio parameters such as transmit powers and channels during initial network deployment and network expansion.

One aspect of the present invention includes the WLAN manager having path loss information on the path loss between the managed APs. In one embodiment, the path loss information is obtained by one or more walkthroughs, while in another, the path loss information is obtained by performing path loss measurements automatically between the APs as described in above mentioned U.S. patent application Ser. No. 10/766,174 and in U.S. patent application Ser. No. 10/629,384 titled "RADIOLOCATION USING A PATH LOSS DATA," filed Jan. 28, 2004 to inventors Kaiser, et al., Docket/Reference No. CISCO-7391, assigned to the assignee of the present invention, and incorporated herein by reference.

Note that the invention does not require there to be a single WLAN Manager entity. The functionality described herein may be incorporated into any of other management entities, e.g., at a local level, or by a separate manager called the Radio Manager that controls the radio aspects of the WLAN. Furthermore, any of these management entities may be combined with other functionalities, e.g., switching, routing, and so forth.

Returning now to FIG. 1, a simple managed network is shown. All management functions, including radio plan generation, are assumed incorporated into a single management entity—a WLAN Manager 103—that has access to the AP Database.

In one embodiment, the WLAN manager 103 that includes a processing system 123 with one or more processors and a memory 121. The memory 121 includes instructions that cause one or more processors of the processing system 123 to implement the radio plan generation described herein. The WLAN manager 103 includes a network interface 125 for coupling to a network, typically wired or otherwise connected. In one embodiment, the WLAN manager is part of a network switch and operated under a network operating system, in this case IOS (Cisco Systems, Inc., San Jose, Calif.).

The WLAN Manager 103 is coupled via its network interface 125 and a network (typically a wired network) to the set of managed APs: AP1, . . . , AP5 with reference numerals 111, . . . , 115, respectively.

Development of a radio plan for this network 100 of FIG. 1 includes assigning a frequency in the form of a transmission channel, and of transmit power to each access point. For example, in an 802.11b or 802.11g network, there may be three channels used, 1, 6, and 11. Each of the access points in network 100 will be assigned one of channels 1, 6, or 11. Others schemes employ four channels, such as 1, 4, 7, and 11 or 1, 4, 8, and 11. In one embodiment, there may be six different transmit power levels, for example, ranging from 0 dBm to 20 dBm for 802.11b access points and from 0 dBm to 15 dBm for 802.11a/g access points.

Figure 2:
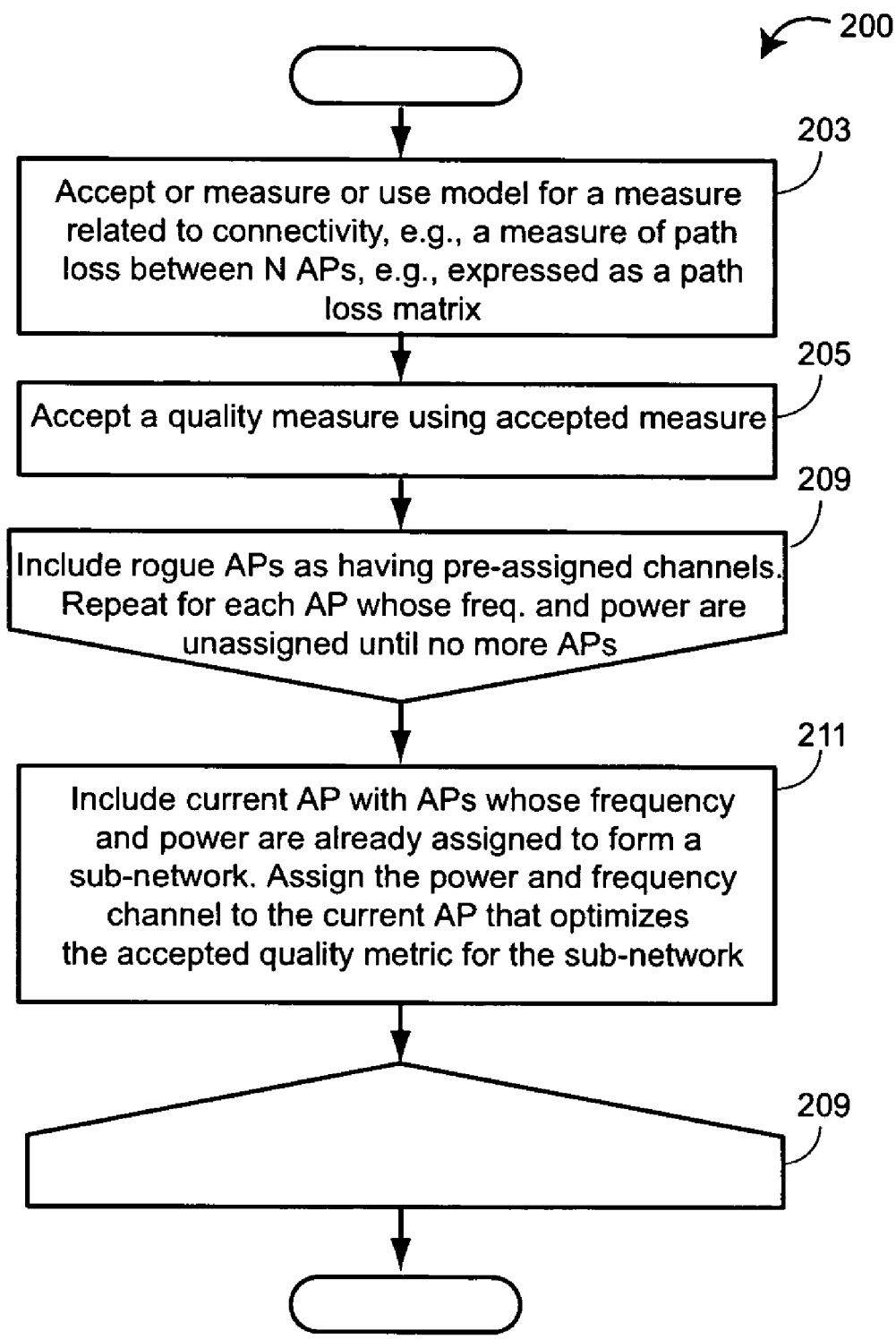
FIG. 2 shows a flowchart of a method embodiment of the present invention that uses a direct non-iterative method to allocate frequencies and power levels to APs.

FIG. 2 shows a flowchart of a method embodiment 200 of the present invention that uses a direct non-iterative method to allocate frequencies and power levels. For this description, denote by N the number of APs in the network, denote by M the number of frequency channels available for allocation, and denote by P the number of transmit power levels.

In 203, the method includes accepting information on the connectivity of the managed and unmanaged APs in the network, used, for example to determine a pre-selected quality measure for determining the quality of a network. One embodiment of the method uses information from measurable data and/or a walkthrough related to the likelihood of AP-to-AP communication.

For example, two such criteria will be described below that depend on the path loss between pairs of APs. For these criteria, an environmental survey of path loss is obtained, e.g., a survey obtained by a walkthrough, or distance and path loss estimation using a model, or, in one embodiment, automatic measurement under control of the WLAN manager, to obtain a measure of expected AP-to-AP path loss. In the case of automatic measurement, each managed AP is able to transmit at a power level under control of the WLAN manager, and is able to report to the WLAN manager the RSSI of any received signals. This provides for determining the AP to AP path loss. For a set of N APs, the path loss is expressible as an N by N matrix denoted L and called the path loss matrix herein.

In one embodiment, the path loss matrix information is converted to "connectivity information" that indicates the likelihood of AP-to-AP communication. In one embodiment, the connectivity information is in the form of one or two binary-valued quantities for each pair of APs indicative of whether or not each AP in the pair is likely to successfully communicate with the other AP of the pair, when the other AP transmits at a selected power level. When expressed in matrix form, for a number denoted N of APs, the connectivity information is called a connectivity matrix herein, and is a function of the transmit powers. Denoting an N-by-N connectivity matrix by C, with the $_{ij}$'th element denoted $c_{ij}(p)$, then $c_{ij}(p)=1$ means that the i'th AP is likely to receive a transmission from the j'th AP, i≠j, and i,j=1, ..., N, when all the other APs (j≠i) are transmitting at a power level denoted by p, while $c_{ij}(p)=0$ means the i'th AP is not likely to receive a transmission from the j'th AP, i≠j, and i, j=1, ..., N when all the other APs (j≠i) are transmitting at a power level p.

In one embodiment, the connectivity matrix is determined from path loss information, e.g., the path loss matrix, and a threshold sensitivity for each receiving AP. The path loss matrix is converted into a connectivity matrix for a pre-selected power assignment p. Based upon a receiver sensitivity, e.g., the input signal strength, e.g., the RSSI in dBm at or above which a receiver is likely to successfully receive a signal when the RSSI is or exceeds the receiver sensitivity threshold, and assuming for each AP i, i=1, ..., N, the other (N−1) potentially interfering APs are transmitting at the pre-selected power p, convert the path loss matrix L into a connectivity matrix C(p), also of dimension N-by-N, with $c_{ij}(p)=0$ if the received power is below a threshold and $c_{ij}(p)=1$ is above the threshold, for the set of i, j=1, ..., N.

Unmanaged APs already have a frequency channel assigned, e.g., the frequency channel in which they were heard, or the frequency channel announced in any beacons from the unmanaged APs. The transmit power is usually unknown, so the maximum transmit power is assumed.

Thus, in 205, a measure indicative of the quality according to an evaluation metric to use for determining the quality of a network is accepted.

The method (209) now assigns (in 211) a transmit power and a frequency channel for each (managed) AP, one AP at a time, in some, e.g., arbitrary order, until there are no APs left to which to assign a frequency channel and a transmit power. Thus, 211 is repeated for a current AP until there are no more APs.

In 211, for each current AP, the method includes the current AP with APs whose frequency and power are already assigned, to form a sub-network. The method determines the accepted quality measure and assigns the power and frequency channel to the current AP that optimizes the accepted evaluation metric for the sub-network. For example, if N'−1 denotes the number of APs that have already been assigned powers and frequency channels, adding the current AP forms a sub-network of N' APs. 211 includes comparing the quality measure for at most M×P versions of the sub-network.

Figure 3:
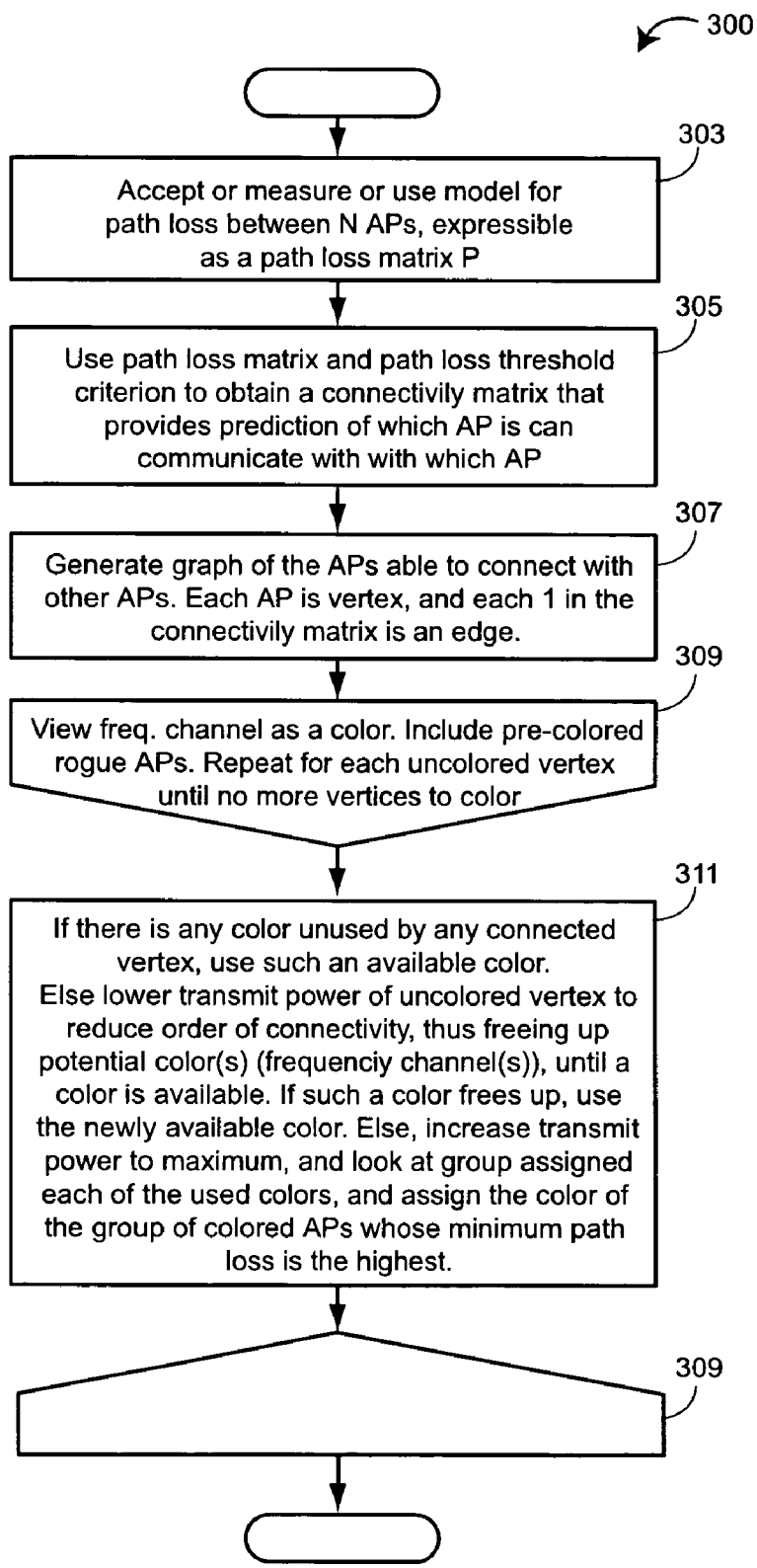
FIG. 3 shows a flowchart of a method embodiment of the present invention that uses a direct, non-iterative method to allocate frequencies and power levels using a quality metric based on connectivity and AP-to-AP path loss.

One embodiment of the flowchart of FIG. 2 is now described in more detail. FIG. 3 shows a flowchart of a method embodiment 300 of the present invention that uses a direct, non-iterative method to allocate frequencies and power levels using an evaluation metric based on connectivity and AP-to-AP path loss. Again, denote by N the number of APs in the network, denote by M the number of frequency channels available for allocation, and denote by P the number of transmit power levels.

Suppose each AP transmits at some initial power level denoted $p_0$. A path loss matrix may be converted to a connectivity matrix for this initial transmit power $p_i$. By considering each frequency as a color, each AP as a vertex of a graph, and the connection between APs as edges of the graph, the problem of frequency allocation becomes a graph coloring problem. Note that this is different from the classical graph coloring problem which seeks to minimize the number of colors (frequency channels in the present context) to color a graph. The radio plan frequency allocation problem rather is one of coloring the graph with a pre-selected number, M, of colors (frequency channels in the present context) to provide some measure, e.g., to minimize some network evaluation metric.

The embodiment of FIG. 3 uses a first evaluation metric for the allocation problem, allocating frequency channels and transmit powers to avoid AP-to-AP overlap, i.e., two APs that are connected transmitting on the same frequency channel. This avoids contention. The first quality measure assumes that such an avoidance of contention sufficiently maximizes network connectivity and throughput.

Note that this is different from the usual cellular telephone frequency allocation problem that seeks to avoid adjacent, i.e., physically close base stations from using the same frequency. With the first metric, connectivity based on likelihood of successful communication is used.

Referring now to FIG. 3, in 303, an environmental survey of path loss is obtained, e.g., a survey obtained by a walkthrough, or distance and path loss estimation using a model, or, in one embodiment, automatic measurement under control of the WLAN manager, to obtain a measure of expected AP-to-AP path loss in the form of a path loss matrix.

In 305, the path loss matrix is converted into a connectivity matrix for an initial power assignment $p_0$. In one embodiment, the initial power assignment is the maximum power. Based upon a receiver sensitivity, e.g., the input signal strength, e.g., the RSSI in dBm at or above which a receiver is likely to successfully receive a signal when the RSSI is or exceeds the receiver, and assuming for each AP i, i=1, ..., N, the other (N-1) potentially interfering APs are transmitting at the pre-selected power $p_0$, convert the path loss matrix L into a connectivity matrix $C(p_0)$, also of dimension N-by-N, with $c_{ij}(p_0)=0$ if the received power is below a threshold and $c_{ij}(p_0)=1$ is above the threshold, for the set of i, j=1, ..., N.

For example, consider the path loss matrix L of FIG. 4A which depicts a path loss matrix giving the path loss of each possible pairing among nine access points (N=9), each having a transmitter and a receiver. Each row corresponds to a particular access point transmitter and each column corresponds to a particular access point receiver. Each entry gives the path loss for the access point pair denoted by the row and column of the entry in dB. The nomenclature "NL" indicates that no link is possible between the two access points. Note that the matrix is not symmetric; in some instances there is a difference between the measured path losses in each direction for the same two access points due to differences in receiver calibration.

Suppose the pre-selected power assignment for each AP is $p_0$=20 dBm. At threshold, a path loss of 112 dB or less is overcome by this power level. FIG. 4B shows the connectivity matrix. Almost all of the access points are connectable to other access points. On the other hand, suppose $p_0$=10 dBm. FIG. 4C shows the connectivity matrix for this transmit power for the path loss matrix of FIG. 4A.

Figure 5A:
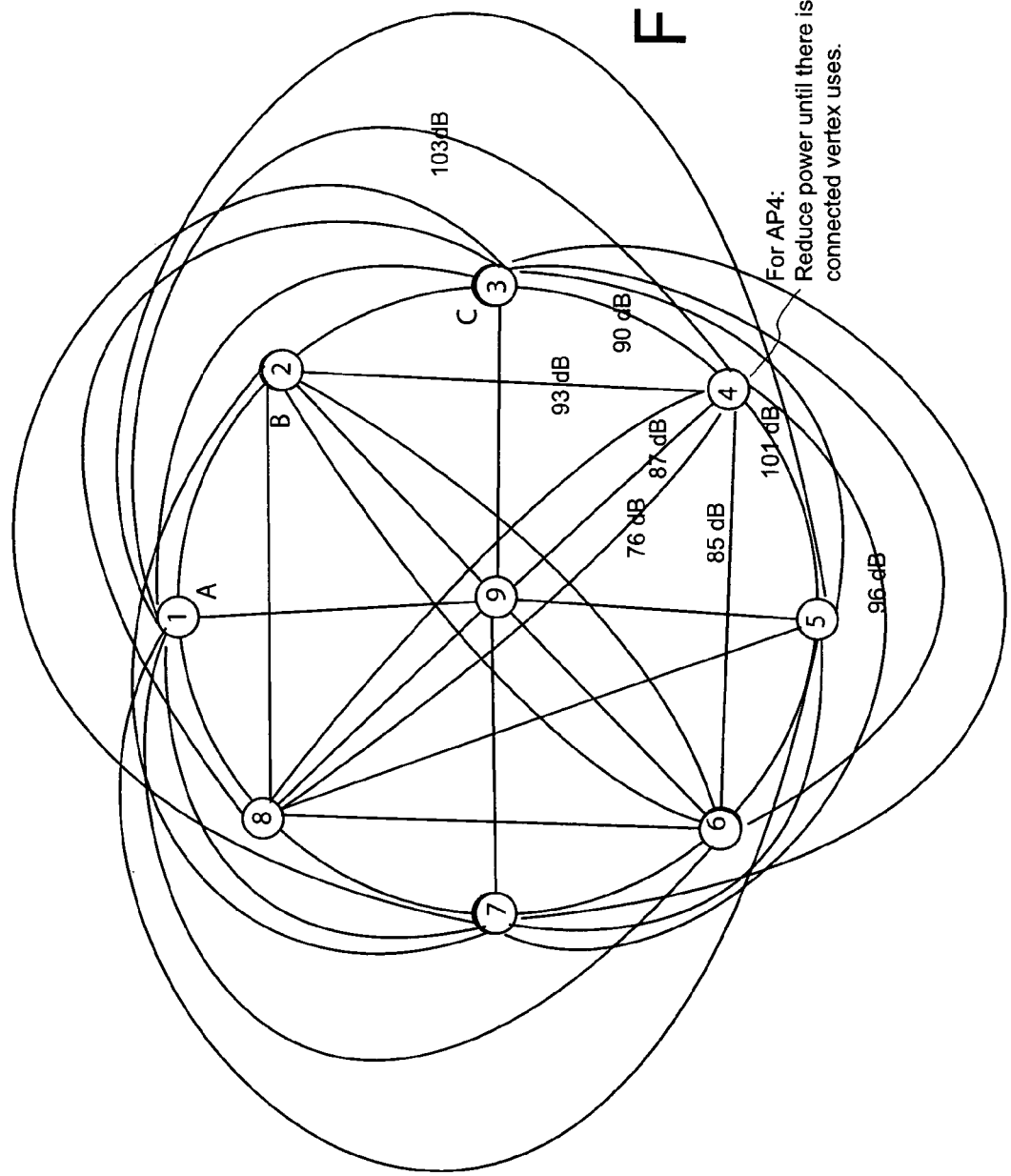
FIG. 5A shows a graph that corresponds to the connectivity matrix of FIG. 4B, and for which a method embodiment assigns colors as frequency channels, and assigns transmit powers. In particular.

In 307, the connectivity matrix is converted to a graph, with each AP a vertex of the graph, and the connections between APs (the ones on the connectivity matrix) as edges of the graph. FIG. 5A shows the graph of FIG. 4B that corresponds to the path loss matrix of FIG. 4A with each of the APs transmitting at $p_0$=20 dBm.

Note that the graph is not a Euclidean representation of the physical AP space, but rather a connectivity map. Many APs will be connected if they can "hear" each other. If this was open space, e.g., as more often occurs in a cellular telephone system, then the connectivity is related to the physical distance, i.e., an AP can hear another AP if it is physically close enough.

In 309, considering each frequency as a color, 311 assigns each vertex a transmit power and a color, i.e., each AP is allocated a frequency channel from the M available frequencies and a power assignment from the P powers such that the first quality measure is minimized for any assigned APs and the current AP being assigned a frequency and transmit power.

Initially, in 311, the AP is assigned the initial power $p_0$, e.g., the maximum transmit power 20 dBm. If there is any color unused by any connected vertex, 311 assigns such an available color, so that the initial power and the previously unassigned color are assigned.

If there are no unassigned colors, 311 lowers the transmit power of the uncolored vertex to reduce the order of connectivity, thus freeing up potential color(s) (frequency channel(s)). 311 repeats the power lowering until a color is available, and then, such a color is used.

If no new color is "released" by the lowering of the power to the minimum possible transmit power level, then the transmit power is set again to the initial level $p_0$, e.g., the maximum transmit power 20 dBm. For each possible color, the group of vertices already assigned such a color is examined, and in particular, the minimum path losses from the vertex at hand to any vertex (AP) assigned such a color is noted. The color assigned to a group whose minimum path loss from the current unassigned vertex is maximum is selected as the color for the present vertex, i.e., the frequency channel for the current AP at the initial power level $p_0$.

Consider FIG. 5A that shows a graph of the connectivity matrix of FIG. 4B, and suppose the order of assigning colors from the set of three colors denoted A, B and C, e.g., for channels 1, 6, and 11, is first vertex 1, then vertex 2, . . . , up to vertex 9. And suppose vertex number i corresponds to the i'th row of the connectivity matrix of FIG. 4B, i=1, . . . ,9.

Starting with vertex 1, since no other vertex is colored, suppose 311 colors vertex 1 with A at power level $p_0$=20 dBm. Moving now to vertex 2, color A is taken by the connected vertex 1, so only colors B and C are available. Suppose 311 colors vertex 2 with B at power level $p_0$=20 dBm. Similarly, suppose 311 colors vertex 3 with C, the only remaining color, and at power level $p_0$=20 dBm. This is shown in FIG. 5. The next vertex is vertex 4. All colors A, B, and C are taken up by vertices 1, 2, and 3, respectively, and these are all connected to vertex 4, so that there is no unused color. According to one embodiment, the transmit power of AP 4 is now reduced step by step until there is an available color, i.e., until there is a color that no connected vertices have been assigned.

Figure 5B:
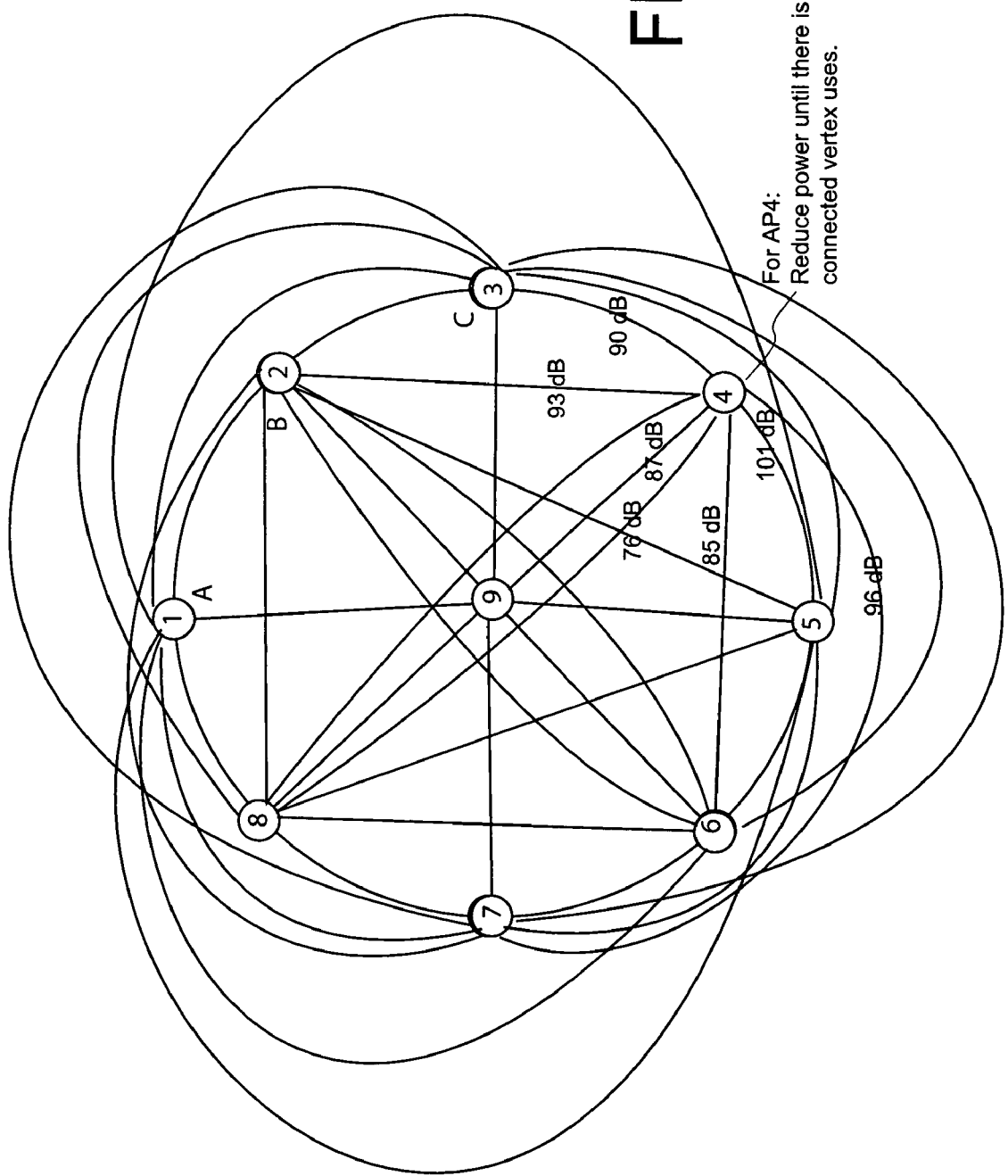
FIG. 5B shows the same graph corresponding to the path loss matrix of FIG. 4A, after the transmit power of AP 4, here shown as vertex 4, has its transmit power reduced to 0 dBm.

FIG. 5A shows the path losses from vertex 4 to all other connected vertices. If transmit power drops to 15 dBm, then all path losses are still above 107 dB, which is the minimum before there is loss of connectivity. Continuing, reducing the transmit power to 0 dBm, the link from vertex 4 to vertex 1 drops. This is shown in FIG. 5B. This frees up color A (previously assigned to vertex 1). Thus vertex 4 is colored with A. That is, AP 1 is assigned frequency channel A and a transmit power of 10 dBm.

Figure 6A:
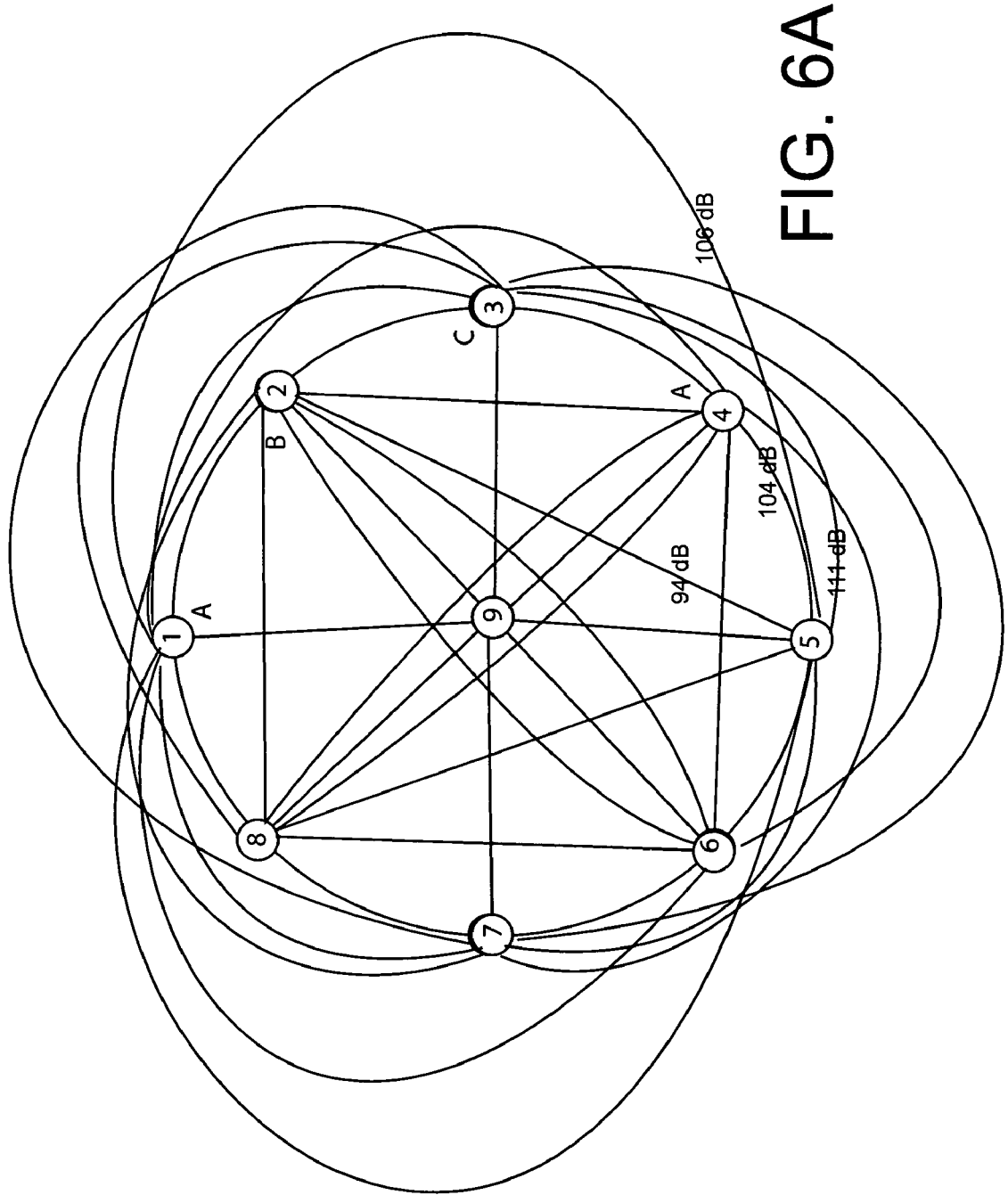
FIG. 6A shows the same graph corresponding to the path loss matrix of FIG. 4A, after the transmit power and frequency channel of AP 4 have been assigned, and with the transmit power of AP 5 set to 20 dBm.

Continuing now to color vertex 5, FIG. 6A shows the path losses to connected vertices that have already been colored. All colors are used, so the transmit power is now reduced. Reducing the power to 15 dBm causes vertex 3 to become disconnected from vertex 5, as shown in FIG. 6B. This frees up color (frequency channel) C. Thus, vertex 5 is colored C, and AP 5 is assigned frequency channel C and transmit power 15 dBm.

Moving to vertex 6, initially, at transmit power 20 dBm, no colors are available. Similarly, at transmit power 15 dBm, no colors are available. At transmit power 10 dBm, the connections to vertex 1, to vertex 3, and to vertex 5 are no longer there, so that color C (frequency channel C) is available. Therefore, AP 6 is assigned frequency channel C at power 10 dBm.

Moving to vertex 7, at transmit power 15 dBm, vertex 6 and vertex 2 become unconnected. This frees up color B. Thus, the method assigns frequency channel B and transmit power 15 dBm to AP7.

Moving to vertex 8, at transmit power 0 dBm, vertices 2, 5, 6, and 7 become disconnected. This frees up color B. Vertex 6 and vertex 2 become unconnected. This frees up color B. Thus, the method assigns frequency channel B and transmit power 0 dBm to AP8.

Finally, continuing with the last vertex, vertex 9, even reducing the power to 0 dBm only causes vertex 1 to become disconnected. So no colors are freed up by reducing the power. Therefore, the method in 311 assigns maximum power and examines the groups of vertices already colored by each color. For each group, the minimum path loss is considered. Thus, color A is assigned to vertices 1 and 4, and the minimum path loss is 88 dB. Color B is assigned to vertices 2, 7, and 8, and the minimum path loss to this group is 87 dB. Color C is assigned to vertices 3, 5, and 6, and the minimum path loss for this group is 85 dB. The greatest minimum path loss is 88 dB to the group assigned color A. Thus, 311 assigns frequency channel A and transmit power 20 dBm to AP 9.

Figure 7:
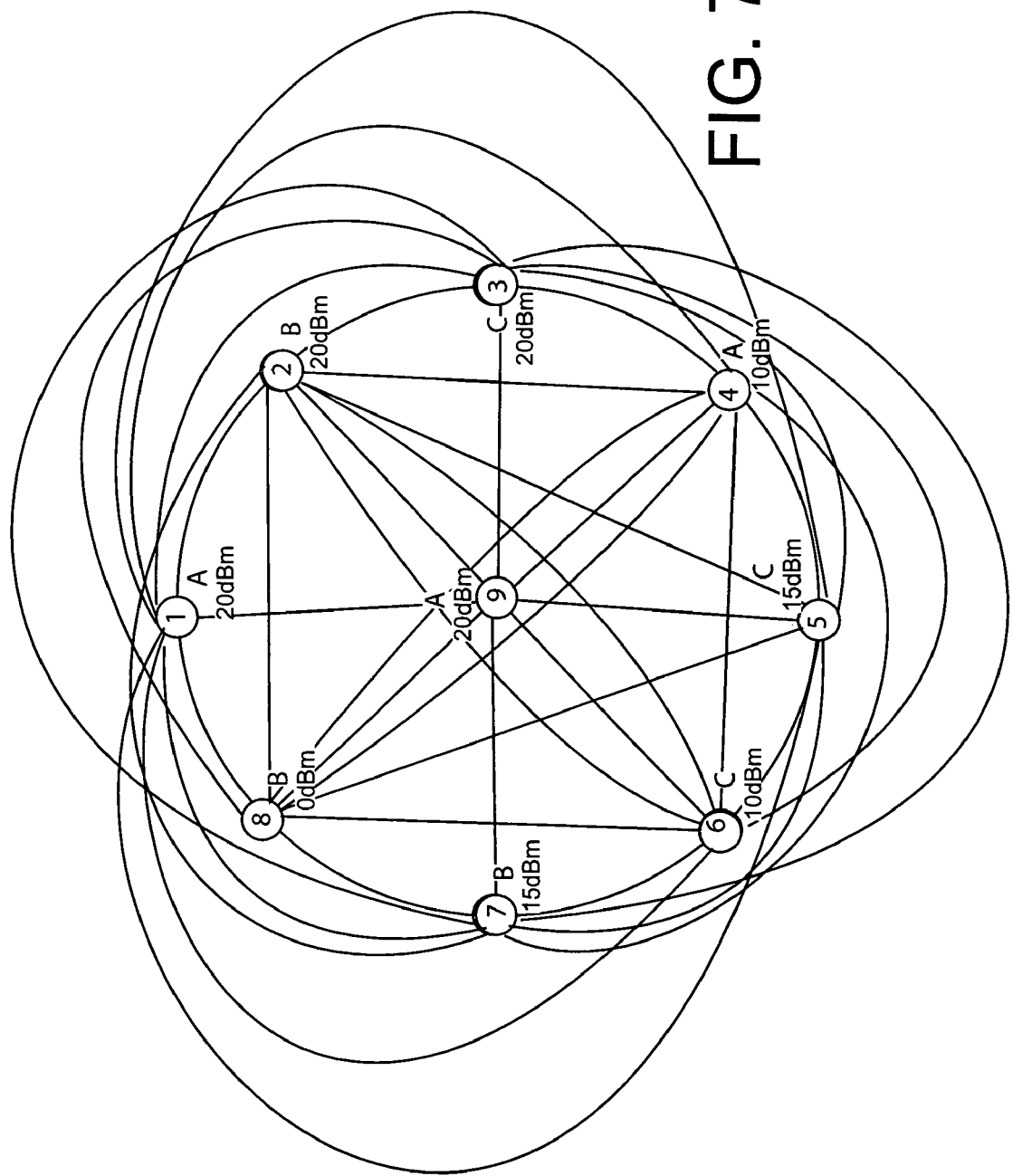
FIG. 7 shows the graph corresponding to the path loss matrix of FIG. 4A after assignment of transmit powers and frequency channels to all the APs according to the method embodiment shown in the flow chart of FIG. 3.

FIG. 7 shows the assignment of transmit powers and frequency channels to all the APs.

Step 311 progresses until all vertices are colored in nearly optimum fashion. The method always produces a radio plan. Unlike global, iterative methods, no local minima or "traffic jams" of color occur. Hence, the method always produces a global solution that has good local characteristics.

The frequency and power allocation of a version of the method of FIG. 2 shown in FIG. 3 uses a first performance metric for the frequency allocation step that assigns frequency channels to each AP (block 309) and that, if needed, reduces transmit power for the AP whose frequency channel is being assigned (in block 311).

Alternate embodiments of the method use different metrics for the allocation in 211 of FIG. 2.

Many network planning tools and associated metrics have been developed for evaluating wireless networks, typically in the context of cellular telephone systems. Wireless networks such as WLANs have different characteristics than cellular telephone systems. As compared to WLANs, cellular networks are outdoors, operate over longer ranges, typically operate at lower carrier to interference ratios, and use very different methods of media access control. The inventors have found that evaluation metrics developed in the cellular telephone context are typically not applicable to wireless LANs.

At any point in the method described in FIG. 2, some frequency channels and powers have been assigned while the current one has not. For example, suppose FIG. 6A shows the situation after APs 1, 2, 3, and 4 have been assigned frequency channels and transmit power, and 211 assigns the channel and power to AP 5 from a set of M channels and P power levels, e.g., 3 channels and 6 transmit power levels for a network conforming to the IEEE 802.11b standard.

In another embodiment, rather than the metric of connectedness and the greatest path loss as described in FIG. 3, a different, second performance metric is used to evaluate each of the possible M-by-P assignments of power and frequency. The second metric is called the "Fast Evaluation Metric," and is described in more detail in the above-mentioned co-owned, incorporated-by-reference U.S. application Ser. No. 10/933,102 to inventors Douglas, et al. Briefly, the second metric provides a method of assessing communication quality in a sub-network of the network that includes the assigned APs and the to-be-assigned AP of the network, and includes: receiving as input path loss information indicating path losses among pairs of the access points in the sub-network, e.g., as a path loss matrix, and further considers the frequency assignments for the access points of the sub-network. From the path loss matrix and frequency assignments, the second metric method includes determining for each pair of access points the likelihood of contention based on path loss between the pair, ascertaining whether or not the APs of the pair share a common frequency assignment, and counting a number of contending pairs of access points to determine the second performance metric for the wireless network.

The fast evaluation metric assumes that the dominant source of capacity degradation is access point to access point contention. The degree of access point to access point contention depends upon the transmit power of the access points. If the transmitted signal from one access point is received at another access point at a level higher than the receiver sensitivity, it will cause that second access point to wait for the channel to clear before it transmits its information. For example, for a receiver sensitivity of −92 dBm, when the access points are transmitting at 20 dBm, if the path loss is less than 112 dB between any pair of access points, they will contend for the channel. For the same receiver sensitivity, when the access points are transmitting at 0 dBm, if the path loss is less than 92 dB between any pair of access points, they will contend for the channel. The determination of whether two access points contend can be understood as a comparison of the path loss to a path loss threshold equivalent to the transmission power minus (in logarithmic terms) the receiver sensitivity. To determine if access points contend one compares the path loss between them to that path loss threshold. The fast evaluation metric result then is a count of the number of access point pairs that contend on each channel.

Evaluation of the fast metric is now described in greater detail with reference to FIGS. 8A-8D.

Assume that three channels are being assigned (M=3), with the channels denoted A, B, and C, e.g., channels 1, 6, and 11 in an IEEE 802.11b compatible network. Assume three channels and power have already been assigned. In particular, assume vertices 1, 2, and 3 have been assigned channels A, B, and C, each at transmit power 20 dBm. Assume the receivers each have sensitivity of −92 dBm.

Suppose eight of the nine APs of the path loss matrix of FIG. 4A have been assigned, and for the simple example, suppose that the eight channel and power assignments are the same as shown in FIG. 7 (except vertex 9, which has not yet been assigned).

FIG. 8A shows the path loss matrix, together with the frequency channel and power assignments for APs 1 through 8. The power assignments are shown in parenthesis. Suppose for this example, one of three frequency channels A, B and C, and one of 5 power assignments: 0, 5, 10, 15, or 20 dBm are to be made.

FIG. 8B shows five possible situations on channel A if AP 9 was assigned channel A. The underlined numbers correspond to the APs that may have contention. FIG. 8C similarly shows five possible situations on channel B if AP 9 was assigned channel B, and FIG. 8D shows five possible situations on channel C if AP 9 was assigned channel C. In the case that AP 9 transmits on channel A, there are three possible contentions plus the contentions with AP 9 transmitting. The minimum is 1 contention for AP 9 transmitting with 5 dBm or less. In the case AP 9 transmits on channel B, there are six possible contentions plus the contentions with AP 9 transmitting. There will be three such additional contentions for AP 9 transmitting at any transmit power. In the case that AP 9 transmits on channel C, there are six possible contentions plus the contentions with AP 9 transmitting. There will be three such additional contentions for AP 9 transmitting at any transmit power.

Therefore, of the 15 possibilities, the least number of contentions for AP 9 is channel A, with 4 contentions on channel A. In such a case, there will also be three contentions on channel B (See FIG. 8C without the last column or row), and 3 on channel C (See FIG. 8C without the last column or row). Therefore the least number of contentions is 4+3+3=10.

One modification involves using a "soft decision" on whether an access point pair exceeds the threshold. Rather than simply counting access point pairs, a value is assigned to each access point based on a function of path loss that varies between zero and one. The function is zero for path losses that far exceed the threshold, one for path losses that are far below the threshold, and falls on a slope that is centered at the threshold. The function result can be understood as an indicator of the likelihood of contention. The total fast evaluation metric is then the sum of these values for the access point pairs.

Other evaluation metrics also may be used in alternate embodiments, as would be clear to those in the art. For example, in one embodiment, the evaluation metric, referred to as a "combined metric" described in incorporated-by-reference U.S. patent application Ser. No. 10/791,466, is used. This combined metric considers factors such as contention and collision among access points and clients, traffic load, the physical space to be covered, and so forth. The input to the combined metric includes path losses between the access points as well as the frequency and power settings of the access points. Note that the combined metric requires sufficient computation time so it is not feasible to evaluate it for every possible solution even for a relatively small number of access points. Accordingly, some embodiments of the present invention use the combined metric early on in the assignment of 211 (FIG. 2), and when the sub-network is sufficiently large, use the fast evaluation metric that can be computed much more quickly.

Thus, a radio plan generator has been described which is a direct method of frequency and power assignment that is extremely fast and easy to implement. The method avoids local minima in performance measure and scales well to very large AP deployments, making it suitable for management of high density AP environments and dynamic frequency assignment requirements of 802.11 h.

The plan generating method has the following features:
1) The computational complexity of the method is proportional to $N^2/\ln(N)$, which is extremely fast compared to directed search type approaches. N is the number of APs.
2) Embodiments of the method to not perform a search for a network with all APs, and do not perform an iterative or recursive procedure. One aspect of the method embodiments is that they are scalable with the number of APs, frequencies, and power numbers.
3) The method embodiments described herein always result in a radio plan. Unmanaged APs can be included. Such unmanaged APs are those whose power levels and/or frequencies are fixed and cannot be changed.

It should be appreciated that although the invention has been described in the context of the IEEE 802.11 standard, the invention is not limited to such contexts and may be utilized in various other applications and systems, for example in other wireless local area networks, including, for example other WLAN standards and other wireless standards. Applications that can be accommodated include IEEE 802.11 wireless LANs and links, wireless Ethernet, HIPERLAN 2, European Technical Standards Institute (ETSI) broadband radio access network (BRAN), and multimedia mobile access communication (MMAC) systems, wireless local area networks, and so forth.

The methodologies described herein are, in one embodiment, performable by a machine such as a WLAN manager that includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein also encompasses a storage system such as a disk drive unit. The processing system in some configurations may include a sounds output device, and a network interface device. The memory subsystem thus includes a carrier medium that carries machine readable code segments (e.g., software) including instructions for performing, when executed by the processing system, one of more of the methods described herein. The software may reside in the hard disk, or may also reside, completely or at least partially, within the RAM and/or within the processor during execution thereof by the computer system. Thus, the memory and the processor also constitute carrier medium carrying machine readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer program that executes on a processing system, e.g., a one or more processors that are part of a WLAN manager. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium.

The software may further be transmitted or received over a network via the network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by the machine and that cause the machine to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic, electromagnetic, or light waves, such as those generated during ultrasonic, radio wave, and infrared data communications. For example, the term "carrier medium" shall accordingly be taken to include, but not be limited to, solid-state memories, optical and magnetic media, and carrier wave signals.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

"Variants of the IEEE 802.11 standard" as used herein means the variants and proposed variants of the IEEE 802.11 standard. Variants are versions defined in clauses of the standard and proposed amendments of the standard.

Furthermore, while the embodiments described above use path loss information, other evaluation metrics may be used that depend on other measures than path loss. For example, receivers have recently become available that provide a measure of the received signal quality, e.g., a measure of the error vector magnitude (EVM). See for example, U.S. patent application Ser. No. 10/367,010, filed Feb. 14, 2003 to Ryan et al., titled SELECTING THE DATA RATE OF A WIRELESS NETWORK LINK ACCORDING TO A MEASURE OF ERROR VECTOR MAGNITUDE, for a description of such a receiver.

Furthermore, while the embodiments described use AP state control in the form of frequency selection and output power, other controls may be used, such as AP antenna selection, gain, polarization, and orientation All publications, patents, and patent applications cited herein are hereby incorporated by reference.

In the claims below and the description herein, the term "comprising" or "comprised of" or "which comprises" is an "open" term that means including at least the elements/features that follow, but not excluding others. The term "including" or "which includes" or "that includes" as used herein is also an "open" term that also means including at least the elements/features that follow the term, but not excluding others. Thus, including is synonymous with and means comprising.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method of assigning frequency channels and transmit powers for a plurality of access points of a wireless network, the method comprising:
   accepting a measure of connectivity between the access points of the network, wherein the measure of connectivity between the access points of the network is a set of pairwise path losses from each access point to a different access point of the network; and
   repeating until there are no more access points to which to assign a transmit power and frequency channel:
      (a) selecting a current access point to which to assign a transmit power and frequency channel;
      (b) determining for a set of at least one transmit power for a set of at least one frequency channel a measure of the quality of the sub-network formed by the current access point and all access points to which a transmit power and frequency channel have been assigned, the measure according to an evaluation metric indicative of the quality of the sub-network; and
      (c) assigning to the current access point the transmit power and frequency channel that minimizes the measure of the quality of the sub-network wherein assigning frequency channels and transmit powers for an access point includes assigning one or more frequency channels and one or more transmit powers for the access point to communicate with its one or more clients.

2. A method as recited in claim 1, wherein the pairwise path losses are obtained by automatic measurements by the access points of the network.

3. A method as recited in claim 1, wherein the pairwise path losses are obtained by a path loss model.

4. A method as recited in claim 1, wherein the pairwise path losses are obtained by measurements from a walk-through.

5. A method as recited in claim 1, wherein the determining of the measure of quality and the assigning of the transmit power and frequency channel includes:
   starting with an initial transmit power for the current access point:, determining the pairwise connectivity from the pairwise path loss using a path loss criterion based on the transmit power and a receiver sensitivity;

ascertaining whether or not there is any frequency channel unused by any AP connected to the current AP, and if so, assigning to the current AP such an available frequency channel at the transmit power;

if the ascertaining ascertains that no frequency channel is available, repeating lowering the transmit power of the current access point to possibly cause one or more of the other access points to become disconnected to possibly free up a potential frequency channel until a frequency channel not used by any connected access point is available, or no frequency channel is available even at the lowest possible transmit power;

in the case a frequency channel frees as a result of the lowering of transmit power, assigning to the current access point the newly available frequency channel and the highest transmit power level at which the channel becomes available; and in the case no frequency channel becomes available, assign the initial transmit power to the current access point, considering groups of access points assigned each of the used frequency channels, and assigning the frequency channel of the group of access points already assigned with a frequency channel whose minimum path loss from the current access point is the highest.

6. A method as recited in claim 1, wherein the evaluation metric is the Fast Evaluation Metric.

7. A method as recited in claim 1, wherein some of the access points are managed access points, and one or more other access points are unmanaged access points for which one or both of the transmit power and/or the frequency channel is pre-assigned.

8. A method as recited in claim 1, wherein the wireless network substantially conforms to one of the IEEE 802.11 standards.

9. A method as recited in claim 1, wherein some of the access points also have one or more other adjustable parameters, and wherein the repeating of the selecting, the determining, and the assigning is until there are no more access points to which to assign a transmit power, frequency channel, and the values of the at least one other parameter, wherein the selecting of a current access point selects a current access point to which to also assign a value for each other parameter, wherein the determining of a measure determines the measure also for a value of each other parameter, and wherein the assigning also assigns each of the at least one other parameter for the current access point.

10. A method of assigning frequency channels and transmit powers for a plurality of access points of a wireless network, the method comprising:

accepting a set of pairwise measures of path losses from each access point to a different access point of the network; and repeating until there are no more access points to which to assign a transmit power and frequency channel:
  (a) selecting a current access point to which to assign a transmit power and frequency channel;
  (b) starting with an initial transmit power for the current access point:, determining the pairwise connectivity from the pairwise path loss using a path loss criterion based on the transmit power and a receiver sensitivity;
  (c) ascertaining whether or not there is any frequency channel unused by any AP connected to the current AP, and if so, assigning to the current AP such an available frequency channel at the transmit power;
  (d) if the ascertaining ascertains that no frequency channel is available, repeating lowering the transmit power of the current access point to possibly cause one or more of the other access points to become disconnected to possibly free up a potential frequency channel until a frequency channel not used by any connected access point is available, or no frequency channel is available even at the lowest possible transmit power;
  (e) in the case a frequency channel frees as a result of the lowering of transmit power, assigning to the current access point the newly available frequency channel and the highest transmit power level at which the channel becomes available; and
  (f) in the case no frequency channel becomes available, assigning the initial transmit power to the current access point, considering groups of access points assigned each of the used frequency channels, and assigning the frequency channel of the group of access points already assigned with a frequency channel whose minimum path loss from the current access point is the highest wherein assigning frequency channels and transmit powers for an access point includes assigning one or more frequency channels and one or more transmit powers for the access point to communicate with its one or more clients.

11. A computer readable medium encoded with computer program instructions that when executed on a processor of a processing system carry out a method of assigning frequency channels and transmit powers for a plurality of access points of a wireless network, the method comprising:

accepting a measure of connectivity between the access points of the network, wherein the measure of connectivity between the access points of the network is a set of pairwise path losses from each access point to a different access point of the network; and repeating until there are no more access points to which to assign a transmit power and frequency channel:
  (a) selecting a current access point to which to assign a transmit power and frequency channel;
  (b) determining for a set of at least one transmit power for a set of at least one frequency channel a measure of the quality of the sub-network formed by the current access point and all access points to which a transmit power and frequency channel have been assigned, the measure according to an evaluation metric indicative of the quality of the sub-network; and wherein assigning frequency channels and transmit powers for an access point includes assigning one or more frequency channels and one or more transmit powers for the access point to communicate with its one or more clients.

12. A computer readable medium as recited in claim 11, wherein the determining of the measure of quality and the assigning of the transmit power and frequency channel includes:

starting with an initial transmit power for the current access point:, determining the pairwise connectivity from the pairwise path loss using a path loss criterion based on the transmit power and a receiver sensitivity;

ascertaining whether or not there is any frequency channel unused by any BP connected to the current BP, and if so, assigning to the current BP such an available frequency channel at the transmit power;

if the ascertaining ascertains that no frequency channel is available, repeating lowering the transmit power of the current access point to possibly cause one or more of the other access points to become disconnected to possibly free up a potential frequency channel until a frequency channel not used by any connected access point is available, or no frequency channel is available even at the lowest possible transmit power;

in the case a frequency channel frees as a result of the lowering of transmit power, assigning to the current access point the newly available frequency channel and the highest transmit power level at which the channel becomes available; and in the case no frequency channel becomes available, assign the initial transmit power to the current access point, considering groups of access points assigned each of the used frequency channels, and assigning the frequency channel of the group of access points already assigned with a frequency channel whose minimum path loss from the current access point is the highest.

13. A computer readable medium as recited in claim 11, wherein the evaluation metric is the Fast Evaluation Metric.

14. A computer readable medium as recited in claim 11, wherein some of the access points are managed access points, and one or more other access points are unmanaged access points for which one or both of the transmit power and/or the frequency channel is pre-assigned.

15. A computer readable medium as recited in claim 11, wherein the wireless network substantially conforms to one of the IEEE 802.11 standards.

16. A computer-readable encoded with computer program instructions that when executed by one or more processors of a processing system to carry out a method of assigning frequency channels and transmit powers for a plurality of access points of a wireless network, the method comprising:

accepting a set of pairwise measures of path losses from each access point to a different access point of the network; and repeating until there are no more access points to which to assign a transmit power and frequency channel:
 selecting a current access point to which to assign a transmit power and frequency channel;
 (b) starting with an initial transmit power for the current access point:, determining the pairwise connectivity from the pairwise path loss using a path loss criterion based on the transmit power and a receiver sensitivity;
 (c) ascertaining whether or not there is any frequency channel unused by any BP connected to the current BP, and if so, assigning to the current BP such an available frequency channel at the transmit power;
 (d) if the ascertaining ascertains that no frequency channel is available, repeating lowering the transmit power of the current access point to possibly cause one or more of the other access points to become disconnected to possibly free up a potential frequency channel until a frequency channel not used by any connected access point is available, or no frequency channel is available even at the lowest possible transmit power;
 (e) in the case a frequency channel frees as a result of the lowering of transmit power, assigning to the current access point the newly available frequency channel and the highest transmit power level at which the channel becomes available; and
 (f) in the case no frequency channel becomes available, assign the initial transmit power to the current access point, considering groups of access points assigned each of the used frequency channels, and assigning the frequency channel of the group of access points already assigned with a frequency channel whose minimum path loss from the current access point is the highest wherein assigning frequency channels and transmit powers for an access point includes assigning one or more frequency channels and one or more transmit powers for the access point to communicate with its one or more clients.

17. An apparatus for assigning frequency channels and transmit powers for a plurality of access points of a wireless network, the apparatus comprising a processing system programmed to execute a method comprising:

accepting a measure of connectivity between the access points of the network; and repeating until there are no more access points to which to assign a transmit power and frequency channel:
 (a) selecting a current access point to which to assign a transmit power and frequency channel, wherein the measure of connectivity between the access points of the network is a set of pairwise path losses from each access point to a different access point of the network;
 (b) determining for a set of at least one transmit power for a set of at least one frequency channel a measure of the quality of the sub-network formed by the current access point and all access points to which a transmit power and frequency channel have been assigned, the measure according to an evaluation metric indicative of the quality of the sub-network; and
 (c) assigning to the current access point the transmit power and frequency channel that minimizes the measure of the quality of the sub-network.

18. An apparatus as recited in claim 17, wherein the determining of the measure of quality and the assigning of the transmit power and frequency channel includes:

starting with an initial transmit power for the current access point:, determining the pairwise connectivity from the pairwise path loss using a path loss criterion based on the transmit power and a receiver sensitivity;

ascertaining whether or not there is any frequency channel unused by any AP connected to the current AP, and if so, assigning to the current AP such an available frequency channel at the transmit power;

if the ascertaining ascertains that no frequency channel is available, repeating lowering the transmit power of the current access point to possibly cause one or more of the other access points to become disconnected to possibly free up a potential frequency channel until a frequency channel not used by any connected access point is available, or no frequency channel is available even at the lowest possible transmit power;

in the case a frequency channel frees as a result of the lowering of transmit power, assigning to the current access point the newly available frequency channel and the highest transmit power level at which the channel becomes available; and in the case no frequency channel becomes available, assign the initial transmit power to the current access point, considering groups of access points assigned each of the used frequency channels, and assigning the frequency channel of the group of access points already assigned with a frequency channel whose minimum path loss from the current access point is the highest.

19. An apparatus as recited in claim 17, wherein the evaluation metric is the Fast Evaluation Metric.

20. An apparatus as recited in claim 17, wherein some of the access points are managed access points, and one or more other access points are unmanaged access points for which one or both of the transmit power and/or the frequency channel is pre-assigned.

21. An apparatus as recited in claim 17, wherein the wireless network substantially conforms to one of the IEEE 802.11 standards.

22. An apparatus of assigning frequency channels and transmit powers for a plurality of access points of a wireless network, the apparatus comprising: means for accepting a measure of connectivity between the access points of the network; and means for repeating until there are no more access points to which to assign a transmit power and frequency channel:(a) selecting a current access point to which to assign a transmit power and frequency channel; (b) determining for a set of at least one transmit power for a set of at least one frequency channel a measure of the quality of the sub-network formed by the current access point and all access points to which a transmit power and frequency channel have been assigned, the measure according to an evaluation metric indicative of the quality of the sub-network; and (c) assigning to the current access point the transmit power and frequency channel that minimizes the measure of the quality of the sub-network, wherein assigning frequency channels and transmit powers for an access point includes assigning one or more frequency channels and one or more transmit powers for the access point to communicate with its one or more clients.

23. An apparatus as recited in claim 22, wherein the evaluation metric is the Fast Evaluation Metric.

24. An apparatus as recited in claim 22, wherein some of the access points are managed access points, and one or more other access points are unmanaged access points for which one or both of the transmit power and/or the frequency channel is pre-assigned.

25. An apparatus as recited in claim 22, wherein the wireless network substantially conforms to one of the IEEE 802.11 standards.

26. An apparatus as recited in claim 22, wherein the determining of the measure of quality and the assigning of the transmit power and frequency channel includes:

starting with an initial transmit power for the current access point:, determining the pairwise connectivity from the pairwise path loss using a path loss criterion based on the transmit power and a receiver sensitivity;

ascertaining whether or not there is any frequency channel unused by any AP connected to the current AP, and if so, assigning to the current AP such an available frequency channel at the transmit power;

if the ascertaining ascertains that no frequency channel is available, repeating lowering the transmit power of the current access point to possibly cause one or more of the other access points to become disconnected to possibly free up a potential frequency channel until a frequency channel not used by any connected access point is available, or no frequency channel is available even at the lowest possible transmit power;

in the case a frequency channel frees as a result of the lowering of transmit power, assigning to the current access point the newly available frequency channel and the highest transmit power level at which the channel becomes available; and in the case no frequency channel becomes available, assign the initial transmit power to the current access point, considering groups of access points assigned each of the used frequency channels, and assigning the frequency channel of the group of access points already assigned with a frequency channel whose minimum path loss from the current access point is the highest.

* * * * *

UNITED STATES PATENT AND TRADEMARK OFFICE
CERTIFICATE OF CORRECTION

PATENT NO. : 7,315,533 B2 Page 1 of 1
APPLICATION NO. : 11/102509
DATED : January 1, 2008
INVENTOR(S) : Theobold et al.

It is certified that error appears in the above-identified patent and that said Letters Patent is hereby corrected as shown below:

Column 18, line 48, before "wherein assigning", insert

-- (c) assigning to the current access point the transmit power and frequency channel that minimizes the measure of the quality of the sub-network, --

Column 19, line 28, after "computer-readable", insert -- medium --.

Column 19, line 38, before "selecting a current", insert -- (a) --.

Signed and Sealed this

Sixth Day of May, 2008

JON W. DUDAS
*Director of the United States Patent and Trademark Office*